UNITED STATES PATENT OFFICE.

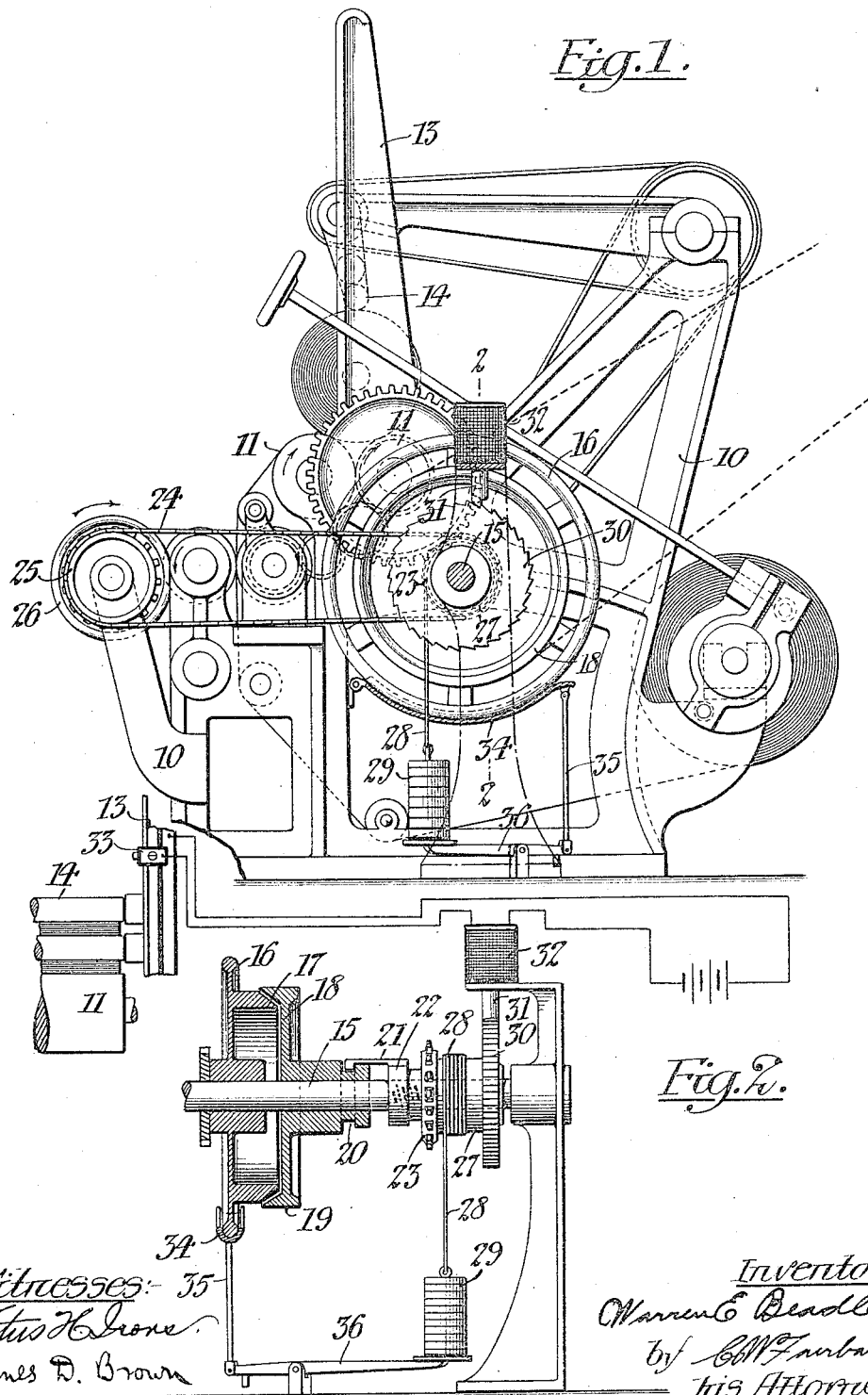

WARREN E. BEADLE, OF BROKAW, WISCONSIN, ASSIGNOR TO SAMUEL M. LANGSTON COMPANY, OF CAMDEN, NEW JERSEY, A CORPORATION OF NEW JERSEY.

STOP MECHANISM FOR WINDING-MACHINES.

1,124,260.  Specification of Letters Patent.  Patented Jan. 12, 1915.

Application filed June 19, 1913. Serial No. 774,571.

*To all whom it may concern:*

Be it known that I, WARREN E. BEADLE, a citizen of the United States, and resident of Brokaw, in the county of Marathon and State of Wisconsin, have invented certain new and useful Improvements in Stop Mechanism for Winding-Machines, of which the following is a specification.

This invention relates to certain improvements in winding machines and relates more particularly to means for automatically stopping the machine after a predetermined winding operation is completed.

My invention is especially adapted for use in connection with winding machines receiving power through a movable cone clutch, and is designed when released to automatically throw out the clutch by a slow uniform movement rather than a sudden or jerky one, and to apply a brake to prevent the continued running of the machine under its own momentum.

I have especially designed my improved mechanism to a type of machine in which the clutch is drawn out of engagement by means of a screw. I provide means normally locked against operation and adapted to be automatically released to rotate the screw and withdraw the clutch.

Reference is to be had to the accompanying drawings, in which similar characters of reference indicate corresponding parts throughout the several views, and in which:

Figure 1 is a front elevation of a portion of a winding machine having my improved attachment applied thereto and Fig. 2 is a transverse section on the line 2—2 of Fig. 1.

My invention is especially applicable to the type of winding mechanism shown in the patent to Langston, No. 1,009,756, issued November 28th, 1911. In this type of machine there is employed a main frame 10 supporting two horizontal parallel rollers 11. Resting upon these rollers and supported solely thereby is the roll of paper or other sheet material being wound. The roll is guided vertically in a standard 13 on the frame and a rider roll or pressure roll 14 rests on the roll of wound material and is also guided by the standard 13. The two lower rolls are positively rotated and serve to effect the rotation of the roll 11 in the winding of the material thereon. The two lower rolls rotate at the same speed in the same direction, and both of them receive power from a main drive shaft 15. In the Langston machine the drive shaft is provided with a hand-wheel 16, and a cone clutch member 17. Loosely mounted on the shaft is a second clutch member 18 integral with or rigidly connected to a main drive pulley 19. By moving the clutch member 18 and drive pulley 19 axially on the shaft they may be brought into or out of engagement with the clutch member 17 and the machine may be driven or permitted to remain stationary at will. For normally starting and stopping the machine the clutch member 18 is provided with a peripheral groove 20, and the yoke or arm 21 of a collar 22 engages in said groove, whereby the collar and clutch member may rotate independently, but an end-wise movement of one is accompanied by an end-wise movement of the other. The collar 22 is screw threaded to its support so that when rotated it moves in an axial direction. For rotating the collar the latter may be connected to a sprocket wheel 23, and a chain 24 may lead from this sprocket wheel to a second sprocket 25 disposed adjacent the front side of the machine and connected to a hand-wheel 26, within easy reach by the operator. None of the parts so far referred to in detail involve any portion of my invention.

In my improved mechanism I connect a drum 27 to the sprocket wheel 23 and wind upon this drum a cord or cable 28 the outer or free end of which is connected to a weight 29. This weight as will be evident normally tends to rotate the drum and the cable is so wound that this tendency is to pull the clutch out of engagement.

For normally preventing the rotation of the drum I provide the latter with a ratchet wheel 30, and a pivoted dog 31.

Adjacent to the dog and either operatively connected thereto or in operative position in respect thereto is an electro-magnet 32. The dog is normally in engagement with the ratchet wheel and prevents the rotation of the latter, but upon closing the circuit through the electro-magnet the dog is released and the weight is permitted to rotate the drum and pull out the clutch.

For closing the electric circuit I may provide electric connections at any point on the machine.

As shown a contact 33 is mounted on the standard 13 of the machine but insulated therefrom. This contact is in the path of the rider or pressure roll and the other wire from the magnet is grounded on the machine. When the roll of paper increases to the desired size the pressure roll will reach the contact 33, close the circuit and release the dog. The weight will then operate to disconnect the machine from the source of power.

To prevent the machine from continuing running under its own momentum I preferably provide a brake shoe 34 adjacent to some rotating part of the machine as for instance the hand-wheel 16, and connect this brake shoe by a link 35 to a lever 36 in the path of the weight 30. As the weight descends and pulls out the clutch it will strike one end of the lever and cause the movement of the brake shoe into operative position.

Having thus described my invention, what I claim as new and desire to protect by Letters-Patent is:

1. A machine having a friction clutch including two rotatable members relatively movable axially to control the stopping and starting of the machine, a drum co-axial with said clutch, connections between said drum and one of said clutch members whereby upon rotation of said drum, said clutch member is moved axially, a cord wound on said drum and having a weight normally tending to rotate said drum in one direction to effect a release of said clutch members, and locking means normally preventing a rotation of said drum.

2. A machine having a clutch for starting and stopping the same, a drum coaxial with said clutch and connected to one member of said clutch, a cable wound on said drum, a weight connected to said cable and normally tending to rotate the drum, and move said clutch member axially to release the clutch, and means normally preventing the rotation of said drum, said means operating to release said drum after a predetermined operation of the machine.

3. In combination, a movable member for stopping and starting a machine, a drum connected to said member, a cord encircling said drum, a weight connected to said cord and normally tending to rotate the drum, means normally preventing the rotation of the drum and a brake for stopping said machine and operated by said weight after said drum is rotated a predetermined distance.

4. A machine having a friction clutch including two rotatable members relatively movable axially to control the stopping and starting of the machine, a drum coaxial with said clutch, connections between said drum and one of said clutch members whereby upon a rotation of said drum said clutch member is moved axially, a cord wound on said drum and having a weight normally tending to rotate said drum in one direction to effect a release of said clutch members, means normally preventing a rotation of said drum and means operating automatically after a predetermined operation of said machine, to render in-operative said rotation preventing means.

5. A machine having a friction clutch including two rotatable members relatively movable axially to control the stopping and starting of the machine, a drum coaxial with said clutch, connections between said drum and one of said clutch members whereby upon a rotation of said drum said clutch member is moved axially, a cord wound on said drum and having a weight normally tending to rotate said drum in one direction to effect a release of said clutch members, means normally preventing a rotation of said drum, means operating automatically after a predetermined operation of said machine, to render in-operative said rotation preventing means, a brake for stopping said machine and means for applying said brake after a predetermined movement of said weight and rotation of said drum.

6. A machine of the class described including a movable member for controlling the stopping and starting of the machine, a drum operatively connected thereto, for moving said member to stop the machine upon a rotation of the drum in one direction, a cord wound on said drum and having a weight normally tending to rotate said drum in said direction, means normally preventing the rotation of said drum, means operating automatically upon the passage of a predetermined amount of material through said machine for rendering said first-mentioned means inoperative, a brake for stopping said machine, means for applying said brake after a predetermined movement of said weight and rotation of said drum.

7. A machine having a clutch including two rotatable members relatively movable axially to control the stopping and starting of the machine, a drum coaxial with said clutch and connected to one of said clutch members whereby upon a rotation of said drum, said clutch member is moved axially, a cord wound on said drum and having a weight normally tending to rotate said drum in one direction to effect a release of said clutch members, a dog normally preventing rotation of said drum in said direction, electrically controlled means operating automatically after a predetermined operation of said machine for rendering said dog inoperative, a brake for stopping said machine, means for applying said brake after a predetermined movement of said weight and rotation of said drum.

8. A machine of the class described having a clutch for controlling the delivery of power to the machine, a rotatable member operatively connected to said clutch for releasing the clutch, gravity operated means for rotating said member, means normally preventing operation of said gravity operated means, electrically operated means for automatically releasing said gravity operated means upon the passage of a predetermined amount of material through the machine, a brake for stopping said machine and operated by said gravity operated means after said rotatable member has rotated a predetermined distance.

9. A machine of the class described having a clutch for controlling the delivery of power to the machine, a rotatable member operatively connected to said clutch for releasing the clutch, gravity operated means for rotating said member, means normally preventing operation of said gravity operated means, electrically operated means for automatically releasing said gravity operated means upon the passage of a predetermined amount of material through the machine, a brake for stopping said machine and operated by said gravity operated means after said rotatable member has rotated a predetermined distance.

Signed at Brokaw, in the county of Marathon and State of Wisconsin this 10th day of June A. D. 1913.

WARREN E. BEADLE.

Witnesses:
WALTER E. SQUIRES,
JOSEPH E. GEORGE.

Copies of this patent may be obtained for five cents each, by addressing the "Commissioner of Patents, Washington, D. C."